(12) United States Patent
Richard

(10) Patent No.: US 6,181,345 B1
(45) Date of Patent: Jan. 30, 2001

(54) METHOD AND APPARATUS FOR REPLACING TARGET ZONES IN A VIDEO SEQUENCE

(75) Inventor: Gilles Richard, Viroflay (FR)

(73) Assignee: Symah Vision, Paris (FR)

( * ) Notice: Under 35 U.S.C. 154(b), the term of this patent shall be extended for 0 days.

(21) Appl. No.: 09/203,573

(22) Filed: Dec. 2, 1998

(30) Foreign Application Priority Data

Mar. 6, 1998 (FR) .................................................. 98 02781

(51) Int. Cl.$^7$ ...................................................... G06F 15/00
(52) U.S. Cl. ............................................................. 345/419
(58) Field of Search .................................. 345/419, 425, 345/427, 433, 435, 121

(56) References Cited

U.S. PATENT DOCUMENTS

| 5,436,672 | 7/1995 | Gerard et al. | 348/591 |
| 5,734,385 | * 3/1998 | Mima | 345/426 |
| 5,949,424 | * 9/1999 | Cabral et al. | 345/426 |

FOREIGN PATENT DOCUMENTS

| 9306691 | 4/1993 | (WO) . |
| 9605689 | 2/1996 | (WO) . |

* cited by examiner

*Primary Examiner*—Phu K. Nguyen
(74) *Attorney, Agent, or Firm*—Larson & Taylor, PLC

(57) ABSTRACT

The method for replacing a target billboard in the frames of a video sequence is usable while the billboard undergoes changes of position in the scene. Assuming that the speed of change is constant, a global transformation from a reference image stored in memory is predicted. A modified image is generated by applying the transformation to the reference image and the prediction is adjusted by a global analysis of the image. Then the representation of the billboard is recovered from its color, and its boundaries are extracted by segmentation. The representation of the billboard is substituted by the representation of the model, after the model is warped by a transformation.

14 Claims, 2 Drawing Sheets

METHOD AND APPARATUS FOR REPLACING TARGET ZONES IN A VIDEO SEQUENCE

BACKGROUND OF THE INVENTION

The present invention describes a method and an apparatus to replace a target zone in successive images of a video sequence, generally originating from a camera or a VCR, where the term "target zone" designates a rigid and identifiable zone.

Such methods and apparatus have already being described (U.S. Pat. No. 5,353,392 or WO-A-91/15921), applicable to a video stream taken in a studio environment as well as to images taken outdoors, notably on a stadium or on a motor racing circuit. The target zone (advertising billboard for instance) is automatically detected in the image using pattern recognition techniques, which use characteristic points or marks located within the target billboard, or next to it, or the stored shape of the zone. The characteristic points may be graphic elements in the target, lines of intensity or color discontinuities (boundaries for instance). The target may be required to have a specific color, blue or green, uniform or not in hue, and this color is then absent from the moving elements of the scene, so that occlusion by these moving parts can be handled by techniques known as "chroma-key" or "blue screen".

The target zone, once identified, is replaced in the video image by a representation of a predetermined model or "pattern" which has been pre-recorded, or by a video sequence. This representation is obtained by warping the model or the sequence so that it adapts to the target zone in such a way that it is seen in the video image at the location where the substitution must be performed.

For easier localization of the target billboard, U.S. Pat. No. 5,436,672 and EP-A-0,684,732 teach using predictive techniques and distinctive points distributed all over the images of the video stream to be modified.

SUMMARY OF THE INVENTION

An object of the present invention is to provide a method and an apparatus which allow the substitution of a target of simple geometric shape, even when the target is moved with respect to the scene (background) viewed by the camera, and when the geometric parameters associated with the camera change.

The latter situation notably happens when the camera undergoes, during image acquisition, angular motions (pan, tilt, and, less often, roll around the optical axis) x, y, and z motions; and/or modifications of the focal length or zooming.

The first case occurs when the target is carried by a mobile object moving within a fixed environment, and also when an actor is prone to move a target zone, can bring it into or out of the field of view of the camera, etc . . .

For that purpose, the invention makes use of the fact that the motion of the camera, and the motion of the target zone in the field of view, can only occur with limited acceleration, and that a prediction performed on the entire image provides a first approximation of the modified position and shape of the target zone.

According to an object of the invention, there is provided a method including the following steps on each successive image of the sequence:

based on the assumption that the speed of modification is constant and a global transformation may be predicted from a reference image, generating a modified image by applying an expected transformation to the image, and adjusting prediction by a global analysis of the image, which allows to use the true motion;

extracting a representation of the target zone based on its color and extracting boundaries thereof by segmentation, and substituting, after checking coherence, the representation of the target zone by the representation of a model to be inserted, after modifying the model by a transformation for matching the representation of the target zone.

The adjustment can be performed using optical flow techniques, which produce predictions in any structured part of the scene common to successive images of the video stream.

As indicated above, different models or patterns may be used.

In particular, the model may originate from a video camera, or from a VCR which outputs animated images. In this case, there is generally used a rectangular target zone of format 4×3 or 16×9, in which a model can be inserted accurately.

In certain cases, especially when the scene observed by the camera contains multiple actors, and/or close-ups, accuracy of the above process may be insufficient. To improve the performance of the method, an additional step of local or global tracking may be added. That step may comprise:

computing a predicted transform, using one of many known methods such as Kalman filtering on successive images, or pattern recognition techniques (already available);

refining the estimation of distinctive points in the target billboard using a 2-D correlation around the distinctive points;

computing a geometric transform matching the position of the distinctive points in the reference image with their position in the current image.

The invention also provides a system with software and hardware elements to perform the above described steps. The implementation of these steps can be performed with a variety of architectures. It is useful, when using off-the-shelf components, to distribute the different tasks among multiple micro-computers such as personal computers, or PCs, connected on a local network using a known protocol, such as Ethernet.

The invention will be better understood by reading the following description of specific embodiments, given as examples only, and which therefore should not considered as limiting the invention. The description refers to the attached drawings.

DETAILED DESCRIPTION

Figure 1:
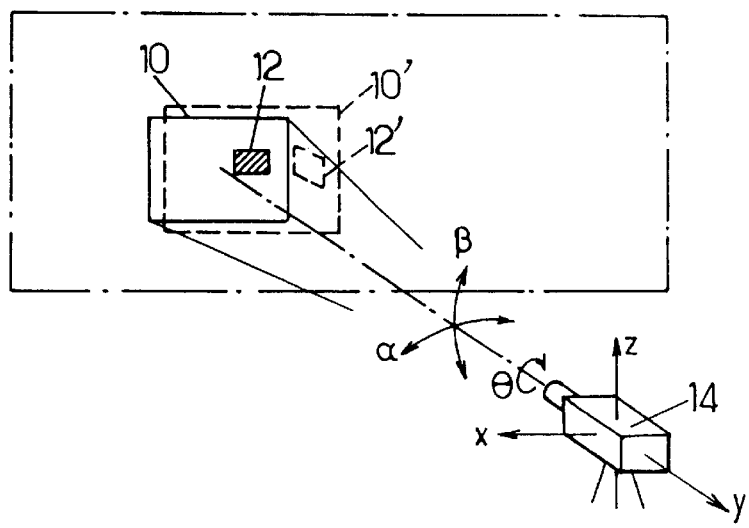
FIG. 1 is a schematic representation of a target to be replaced on a background.

The process and apparatus which will be described allow live insertion, in real-time, of a virtual model, pattern or window, into an image taken by a camera or recorded in a VCR, as a substitution of a target zone. As shown in FIG. 1, it allows to replace a target zone consisting of a billboard 12 in the field of view 10 of a camera 14, even when:

the image acquisition parameters change during the course of the shoot, the billboard 12 is prone to be translated or rotated with respect to the rest of the observed scene, for instance moved into a position indicated by 12, whereas the field of view of the camera becomes that indicated at 10.

The camera displacements can be angular motions i.e., pan α, tilt β, and, less often, roll θ around the optical axis, and also displacements in x, y and z; furthermore, there may be changes of focal length.

It is important for the inserted model to follow the movements of the camera and the displacements of the target.

Furthermore, it is desirable for these operations to be performed by image processing techniques only, without motion sensors which would make the system inadequate in many situations, especially in the presence of low frequency vibrations (which occur in the proximity of stadium seats), and when the camera focal length is very long.

The process and apparatus can be considered as having several modules, defined below, each one fulfilling a given function. In some cases, it is sufficient to activate some of the modules only to achieve the substitution with sufficient precision.

A pattern recognition module serves to identify and localize the target in the image obtained from the camera.

A global tracking module measures the global motion of the image captured by the camera, and therefore continuously estimates the focal length variations of the camera, and the relative translation (linear movement) between consecutive fields of view.

A tracking module measures the local motion of the billboard, and the precise position of its vertices or corners, when this is necessary to improve the performance of the system.

A data fusion module estimates the position and geometric aspects of the billboard in the image for every field, using information provided by the tracking module (or modules) and by the pattern recognition module.

A graphic insertion module scales the model which has been stored, or originates from a video sequence source, possibly applies a perspective transform to this model, and replaces the target by the model in the image.

These individual modules will be described in succession.

Pattern Recognition Module

The following description corresponds to a particular case where the target to be replaced is of rectangular shape. The process, however, is applicable to any other four-sided polygon, and even to any other polygon.

The first operation performed by the pattern recognition module 16 is to transform the original video image into a binary image, in which all visible pixels on the surface of the target billboard which have a specific color, or belong to a set of specific colors, are declared "active", by assigning to them a value different from the value assigned to the pixels in the rest of the scene observed by the camera in two dimensions. In general, the billboard will be green or blue, of uniform hue, or exhibiting hue or value variations that permit to obtain a graphic pattern while not detrimental to use of chroma-key techniques.

Contour extraction is performed on the binary images by declaring "active" only those pixels which belong to the boundary of the billboard. A new binary image is obtained, which is transformed into a linked list of pixels, by connecting adjacent active pixels.

A segmentation operation is performed for approximating the linked list of pixels as a collection of line segments, which is appropriate when the billboard is bounded by a polygon, and is very simple when the perimeter of the target billboard has the shape of a four-sided polygon in the image.

The above operations may be sufficient to identify the target billboard, when the billboard is not occluded at all, and is the only part of the image with the selected color. More often, however, a correspondence, or "matching" step is necessary, either because there exist multiple possible billboards in the scene, or because other elements of the image exhibit the same color.

The matching step implies that the vertices of the billboard (for instance the four corners of a rectangle) have been manually identified during an initial phase. Correspondence is then established by selecting that candidate four-sided polygon obtained by the segmentation phase which is most similar in shape to the initially defined billboard.

Once the best four sided polygon is chosen, the positions of the four corners of the corresponding target billboard are sent to the data fusion module, together with a "measure of belief" indicator, which allows to perform a verification step.

Global Tracking Module

The global tracking module 18 is programmed to sequentially perform a set of operations.

The first operation is to reduce the degree of spatial sampling of the image, for instance by a factor of 8 in successive octaves, in order to reduce the number of processed pixels, and to reduce the noise, since spatial sub-sampling constitutes low pass filtering.

Subsequent operations require access to a reference image. The estimation of the changes in image acquisition parameters (translation, rotation and changes in focal length) is performed with respect to this reference image. A reference image is periodically stored by copying the current image in a number of situations:

when the current image is the first processed image of a sequence, when the current image becomes too different from the stored reference image, due for instance to camera displacement or to a focal length change larger than a predefined threshold, or due to the presence of obstacles, when the current image is too old, for instance older than two seconds.

Under these conditions, a camera rotation and a camera translation along x or y have nearly identical effects on the 2-D image.

The module then computes a predicted transformation using the hypothesis that the transformation occurs at constant speed for all parameters. For the second image of a video stream, the prediction simply assumes that the speed is 0.

The reference image is then re-sampled by applying to it the predicted transform. A transformed image is then obtained which resembles the current image.

The next step is a rough estimation of all of the translation parameters associating the reference image with the current image, using a correlation approach. Several criteria can be used to perform this operation. It is of advantage to use a criterion of "clipped distance", which has the advantage of being robust in the presence of noise.

A second re-sampling of the reference image is then performed, using the rough estimation now available, instead of the prediction only.

A precise estimation of the transformation between the reference image and the current image still needs to be performed. Several iterations, for instance three, may be used, using the sampled reference image each time. The precise estimation of the transformation can use a gradient method, also called optical flow. A description of such a method may be found in Brian G. Shunk's paper "The Image Flow Constraint Equation", Computer Vision, Graphics and Image Processing 35, pp. 20–46 (1986).

Finally, the transformation is passed to the data fusion module.

Local Tracking Module

The function of the local tracking module 22 is to provide an accurate estimation of the transformation undergone by the target billboard, with respect to its representation in the reference image, when the pattern recognition module does not provide a satisfactory result, and also in order to confirm the result obtained during the pattern recognition phase, when the indicated degree of similarity is low.

An initial indication of the billboard to be tracked can be given manually. An operator then selects the corners of the target billboard in the image with a stylus and touch tablet or otherwise. In principle, the indication of the billboard can also be provided using a comparison between a recorded color and the color of the pixels, therefore from the information provided by the pattern recognition module, at the beginning of each sequence. This approach, however, critically relies on homogeneous lighting of the target billboard.

Usually, the predicted transform is obtained by using "predictions" based on continuity assumptions, from previous transforms. Among others, a Kalman filter may be used. In some cases, two predictors will simultaneously be used, one from the pattern recognition module, and the other from the Kalman filter. The predicted transformation deemed better is selected, and this transformation is applied to a non-ambiguous set of points selected by the user during an initialization phase. Such points may be designated as "interest points" or "distinctive points". These points correspond to areas exhibiting strong contrasts of luminance and/or chroma, generally on the edges of the billboard or near these edges. In particular, the points may be the corners of the billboard identified as neighbour windows of size 15×15 pixels.

The true position of all interest points present in the current image must then be exactly defined starting from the estimation based on the predicted transform. To this end a 2-dimensional correlation may be performed between a window extracted from the current image, and constituting a neighborhood of the interest point, and a window extracted from a reference image digitized once and for all during the initialization phase.

When the y motions and/or the focal length are likely to change significantly, it is preferable to store the reference image at several scales. The correlation is then computed between the predicted points of the current image and the predicted points of the representations of the reference image. This reference image is appropriately scaled according to the predicted transformation of the reference image which is at an appropriate scale, selected according to the predicted transform.

Once the true position of the interest points in the current image is defined, the module is able to compute the geometrical transformation that relates this position to the one corresponding to the points of interest in the reference image. This is achieved by using, for instance, a least square method, typically applied iteratively for instance three times, in order to reject clearly deviating points.

Data Fusion Module

Figure 2:
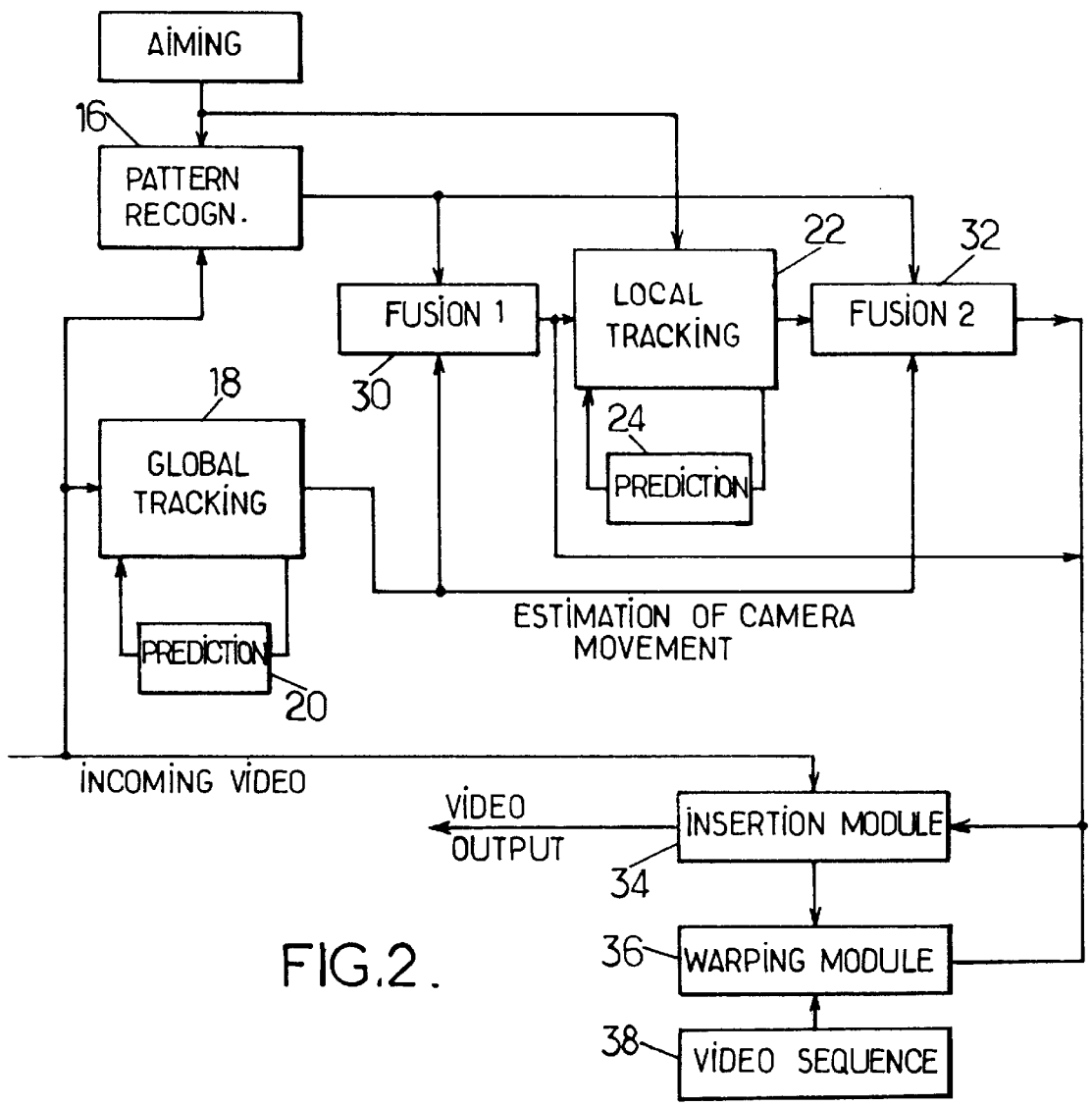
FIG. 2 is a block diagram.

The function of the data fusion module is to estimate the position and the appearance of the target billboard in each frame, either using the information provided by the pattern recognition module 16, if the quality of the information obtained using this module is satisfactory, as indicated by 30 on FIG. 2, otherwise using the last correct estimation provided by the pattern recognition module and the data provided by the local tracking module, as indicated at 32.

To permit selection between the two approaches, the qualities of the information produced by modules 16 and 22 are checked by the fusion module.

The quality check can be performed using criteria such as time coherence, which allows to determine whether modifications are due to vibrations or other factors, and to evaluate a resemblance or validity index produced in module 16 or 22.

If the quality of the positioning provided by the pattern recognition module 16 is satisfactory, the fusion module performs a smoothing operation, in order to produce an accurate position for the points of the quadrilateral, this smoothing operation being achieved using a low-pass filter.

However, if the pattern recognition module provides a poor quality position estimate, an extrapolation of the result is performed using the data provided by the local tracking module.

If the quality of the positioning provided by extrapolation from the data of the local tracking module is still not satisfactory, the last correct estimation provided by the pattern recognition module 16 can be extrapolated from the data of the global tracking module.

In all cases, a final smoothing operation is performed, and the coordinates of the corners are sent to the insertion module 34 and also to the warping module 36. This module performs a warping using scale changing and a deformation of the images stored in memory, or coming from a video sequence 38.

Insertion or inlay may be achieved using a conventional technique of blue screen or chroma-key in order to substitute, in the current image, only those pixels of the target billboard which are not occluded. It is not necessary to describe here the techniques used, which are standard practice in television.

As mentioned above, it is not necessary for the billboard to be of rectangular shape. Without noticeable complication, a polygonal billboard with any number of corners can be used, or even a billboard with holes. In the last case, the modules will achieve localization of the billboard corners and internal vertices. To allow a simple management of the re-entrance of the billboard into the field after an exit from it, it is preferable to impose the constraint that the billboard stay motionless in the scene during all the time it is out of the field of view.

Figure 3:
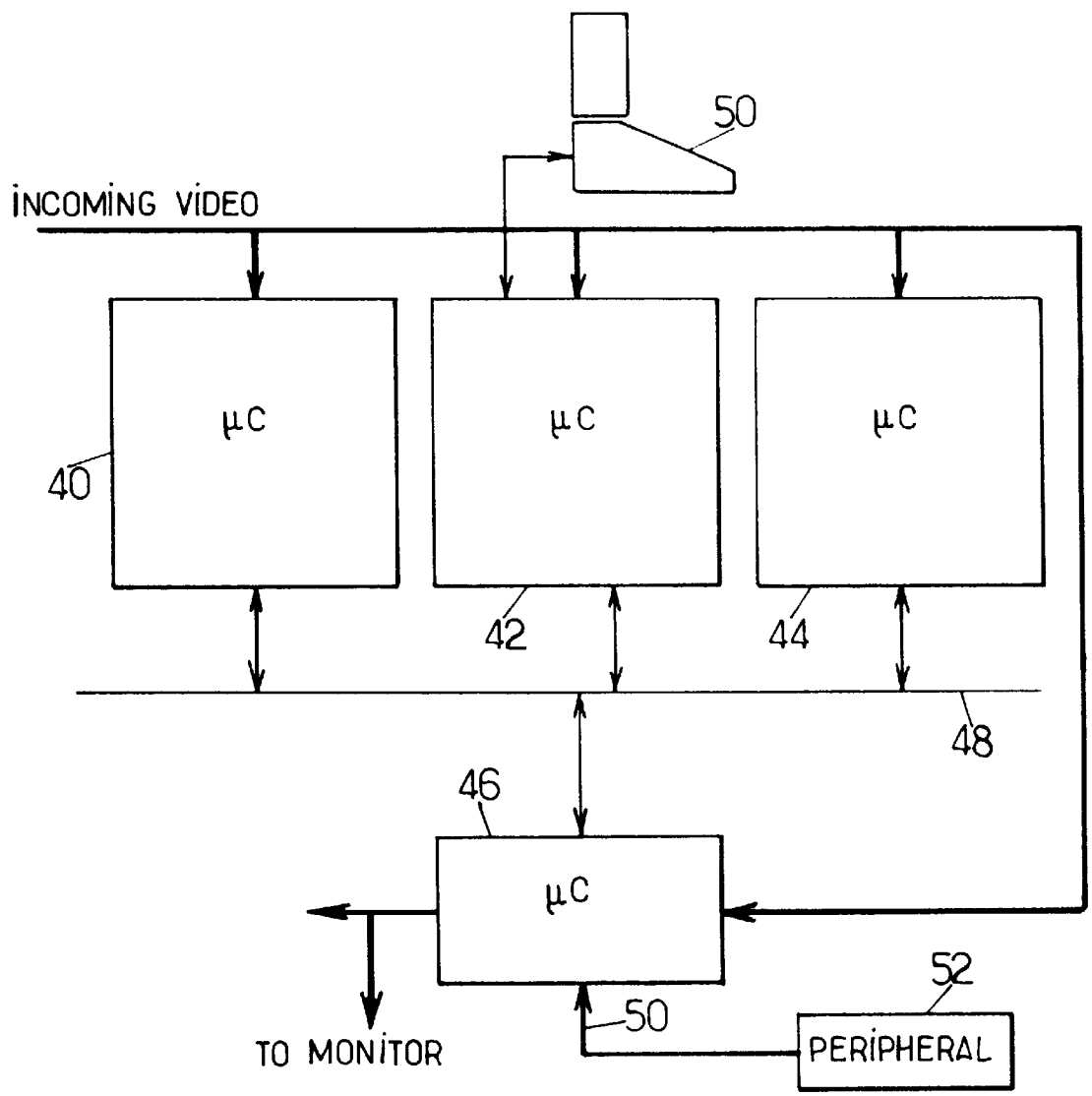
FIG. 3 shows a possible hardware architecture for the system.

The functionalities of the modules mentioned above may be implemented in an architecture of the kind showed in FIG. 3, having several microcomputers 40, 42, 44 and 46 communicating with each other through a local network 48. The first micro-computer 40 may be assigned to the pattern recognition and data fusion tasks. The second computer 42 may be dedicated to the human-machine interface 50 and be programmed to achieve local tracking, which is used only in certain cases. The computer 44 is programmed to perform global tracking. Finally, the last microcomputer 46 achieves insertion or inlaying. It includes an input 50 for the input of fixed or animated images coming from a peripheral 52, which may be a store, a V.C.R. or a camera, whose images are modified so that they exactly match the representation of the target billboard.

In the microcomputer 42, the global tracking works at the same time as the human-machine interface.

The apparatus can be included in a studio system containing one or more conventional display monitors, showing the operator the images provided by the camera or the cameras filming the real scene. Another display monitor permits to see the output image. Finally, several microcomputers 46, or a computer working in time sharing may be added, to provide, from a single video stream, several output video streams with different implanted elements, for different broadcasting audiences. Processing can be distributed, the initial images being sent with the information provided by the fusion module to a broadcaster who then chooses the models to be inserted in the down link from a repeater such as a TV satellite.

What is claimed is:

1. A method for replacing a representation of a target zone with a pattern in successive images of a video sequence, suitable for use while the target zone has a position with respect to a background scene which changes during the video sequence, comprising, for each of successive images of the video sequence, the steps of:

(a) assuming that said position changes at constant speed, determining a global transformation predicted from a stored reference image, generating a modified image by applying the global transformation to the reference image, and adjusting the predicted transformation through a global analysis of the image;

(b) recognizing said representation of the target zone from a colour thereof and extracting boundaries thereof by segmentation; and (c) verifying a coherence of the recognition, subjecting said pattern to a transformation responsive to the representation recognized at step (b) and substituting the representation of the target zone, by the transformed pattern.

2. Method according to claim 1, further comprising the steps of:

(d1) computing a predicted local transform;

(d2) refining an estimation of interest points in the target zone using a 2-D correlation around the interest points; and computing a geometric transform relating positions of the interest points in the reference image to their position in the current image of the video sequence.

3. Method according to claim 2, wherein step (d1) makes use of Kalman filtering on successive images.

4. A method according to claim 2, wherein step (d2) is performed using a correlation of neighborhoods of several representations of the reference image at different scales.

5. A method according to claim 2, comprising estimating the position and appearance of the representation of the target zone in each current image during step (c).

6. The method of claim 5, wherein estimation is made using the last correct estimation provided by pattern recognition and data provided by local tracking if quality is unsatisfactory.

7. The method of claim 6, wherein estimation is made using information provided by pattern recognition after it is found that quality of information obtained by said pattern recognition is satisfactory.

8. A method according to claim 1, wherein a specific color is assigned to the target zone and identification thereof in the current image is from said specific color and its shape.

9. A method according to claim 8, wherein the target zone is of rectangular shape when not distorted.

10. A method according to claim 9, wherein said rectangular shape has a format of 4×3 or 19×9 and the pattern originates from a video camera or a V.C.R.

11. The method of claim 1, wherein the stored reference image used for predicting said global transformation is periodically refreshed by storing the current image of the video sequence responsive to any one of the following situations:

when the current image is a first image to be processed in the video sequence, when the current image becomes different from the reference image in excess of a predetermined amount, when the reference image is older than a predetermined time.

12. The method of claim 11, wherein said predetermined amount relates to motion or change in focal length exceeding a predefined threshold or the presence of occluding obstacles.

13. The method of claim 11, comprising re-sampling the reference image after computation of a predicted transformation by: applying the predicted transformation in order to obtain a deformed and shifted image; roughly estimating a translation from the reference image to the current image, using a correlation process; re-sampling the reference using the available rough rather than prediction; and evaluating the transformation required for passage from the reference image to the current image using several iterations based on a gradient approach.

14. An apparatus for replacing a representation of a target zone with a representation of a pattern in successive images of a video sequence, suitable for use while the target zone has a position with respect to a background scene which changes during the video sequence, comprising a plurality of micro-computers programmed respectively for:

(a) assuming that said position changes at constant speed, determining a global transformation predicted from a stored reference image, generating a modified image by applying the global transformation to the reference image, and adjusting the predicted transformation through a global analysis of the image;

(b) recognizing said representation of the target zone from a colour thereof and extracting boundaries thereof by segmentation; and (c) verifying a coherence of the recognition, subjecting said pattern to a transformation is responsive to the representation recognized at step (b) and substituting the representation of the target zone, by the transformed pattern.

* * * * *